US006299077B1

(12) United States Patent
Harmon et al.

(10) Patent No.: US 6,299,077 B1
(45) Date of Patent: Oct. 9, 2001

(54) ACTUATION SYSTEM FOR CONVERGENT/ DIVERGENT NOZZLE

(75) Inventors: Kenneth E. Harmon, North Palm Beach, FL (US); Dale W. Petty, Wallingford, CT (US)

(73) Assignee: United Technologies Corporation

( * ) Notice: Subject to any disclaimer, the term of this patent is extended or adjusted under 35 U.S.C. 154(b) by 0 days.

(21) Appl. No.: 09/465,250

(22) Filed: Dec. 18, 1999

(51) Int. Cl.[7] ........................................ B05B 12/00

(52) U.S. Cl. ................................ 239/265.37; 239/265.19; 239/265.39; 239/265.35; 60/265

(58) Field of Search ......................... 239/265.19, 265.35, 239/265.37, 265.39, 265.41; 60/265

(56) References Cited

U.S. PATENT DOCUMENTS 5,934,564 * 8/1999 Bouiller et al. ................. 239/265.37

* cited by examiner

*Primary Examiner*—Charles G. Freay
*Assistant Examiner*—Eric Hayes
(74) *Attorney, Agent, or Firm*—Norman Friedland

(57) ABSTRACT

The horsepower requirements for the actuation system for a convergent/divergent exhaust nozzle for a gas turbine engine is reduced by the judicious selection of the crank arms and their location on a torque shaft that rotates to move a connecting link attached to the convergent flap of the nozzle. A pressure balancing hood is attached to the top surface on the forward end of the convergent flap to augment the lowering of the horsepower requirements. In another embodiment a tie rod/end cup arrangement and two piece torque shaft are utilized for ease of removal of the actuation system from the exhaust nozzle assembly.

10 Claims, 4 Drawing Sheets

ACTUATION SYSTEM FOR CONVERGENT/ DIVERGENT NOZZLE

This invention was made under a contract from the U.S. Government and the U.S. Government has rights herein.

TECHNICAL FIELD

This invention relates to exhaust nozzles for gas turbine engines for powering aircraft and more particularly to the actuation system for a two dimensional exhaust nozzle.

BACKGROUND OF THE INVENTION

As one skilled in the aircraft turbine engine technology appreciates, it is abundantly important that the weight and size of the hardware in the exhaust nozzle is held to the minimum in order to assure that the thrust to weight ratio is optimized. Of course, it is equally well known that due to the aircraft and engine configurations, the size of the hardware is dictated by the aircraft manufacturer. In aircrafts that utilize vectoring nozzles, this is particularly true because these aircraft are typically made for the military and the performance of the aircraft is of the utmost importance.

In order to meet these goals and reduce actuator size, we have found that we can provide a nozzle actuation system that locates the actuator so that its load is tangential to the attached bell crank arm. Additionally the link interconnecting the other bell crank arm is oriented so that it is substantially normal to the convergent flap at the maximum loading condition and a pressure balancing hood is attached to the forward convergent flap hinge point. This nozzle actuation system made in accordance with the teachings of this invention affords the following advantages over the heretofore known nozzle actuation systems.

1. The systems horsepower requirements are lowered.
2. The distortion on the convergent flaps is minimized and the throat area remains more constant.
3. The vertical loads on the convergent flap's forward hinge is reduced.
4. Because of the reduction in flap distortion, this invention reduces the friction in the convergent/divergent hinge.
5. The load distribution is more even than heretofore known systems with a consequential load improvement on the supporting duct structure.

SUMMARY OF THE INVENTION

An object of this invention is to provide for a gas turbine engine with a two-dimensional vectoring exhaust system that powers and maneuvers aircraft an improved actuation system.

A feature of this invention is the location of the actuator relative to the bell crank of the linkage system in a convergent/divergent nozzle of a two-dimensional actuation system so that the load of the actuator is tangential to the arm of the bell crank.

Another feature of this invention of the nozzle actuation system is the linkage connected to the hinge point of the convergent/divergent nozzle is judiciously located to be substantially normal thereto at the maximum load condition.

Another feature of this invention is the judicious location of the pressure balancing hood extending from the forward end of the convergent flap so as augment the horsepower reduction of the actuator.

The foregoing and other features of the present invention will become more apparent from the following description and accompanying drawings.

These figures merely serve to further clarify and illustrate the present invention and are not intended to limit the scope thereof.

DETAILED DESCRIPTION OF THE INVENTION

While this invention is being described in the preferred embodiment as being utilized on a two-dimensional exhaust system, as one skilled in this art will appreciate the teachings of this invention can be applied to other actuation systems. Further, while this patent application describes the preferred embodiment as having symmetrical actuation systems above and below the nozzle horizontal center line, it is within the scope of this invention that the actuation systems can be asymmetrical, i.e. the system above the horizontal center line is different than the system being utilized below the horizontal center line. Moreover, the actuation system can be electrical rather than the hydraulic system being described in the preferred embodiment.

Figure 1:
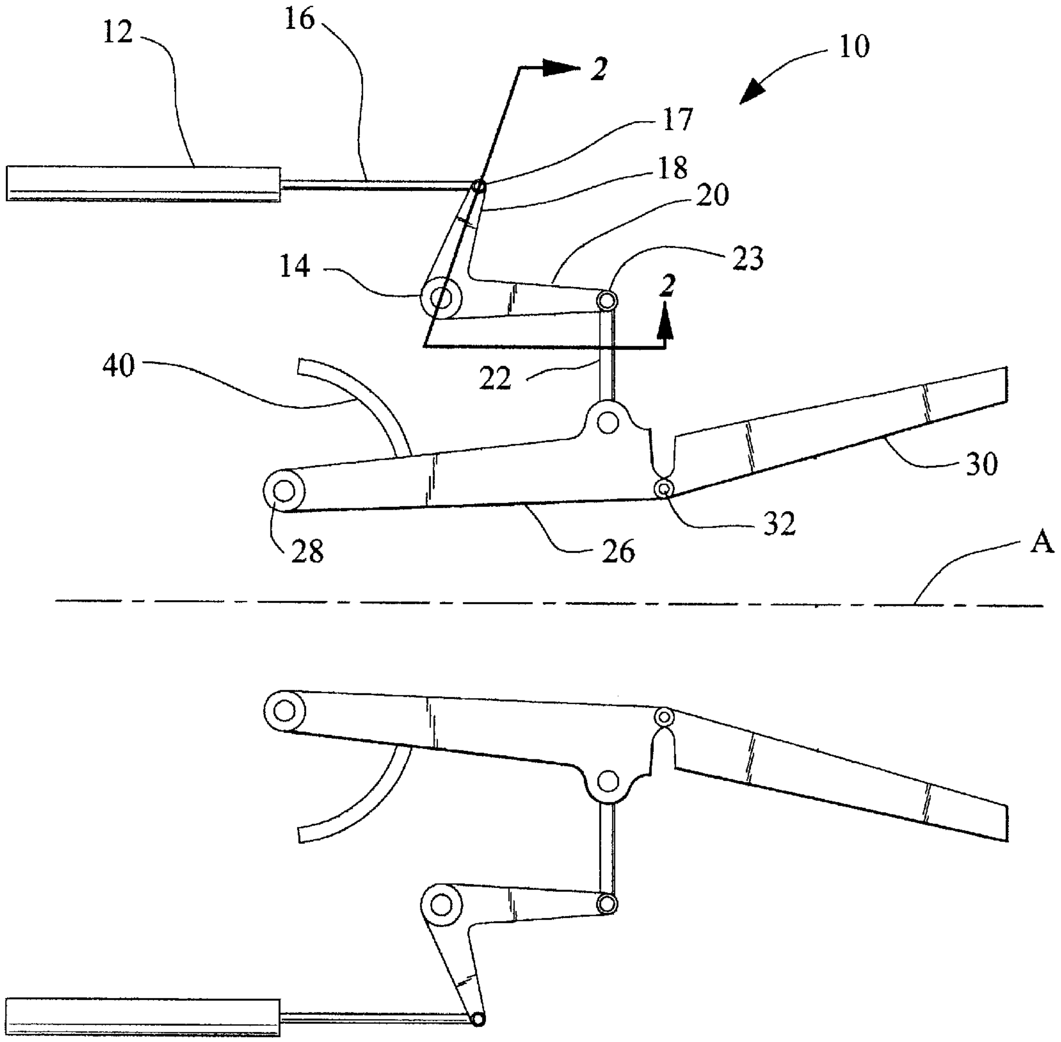
FIG. 1 is schematic of the actuation system for a convergent/divergent nozzle illustrating the invention.
Figure 2:
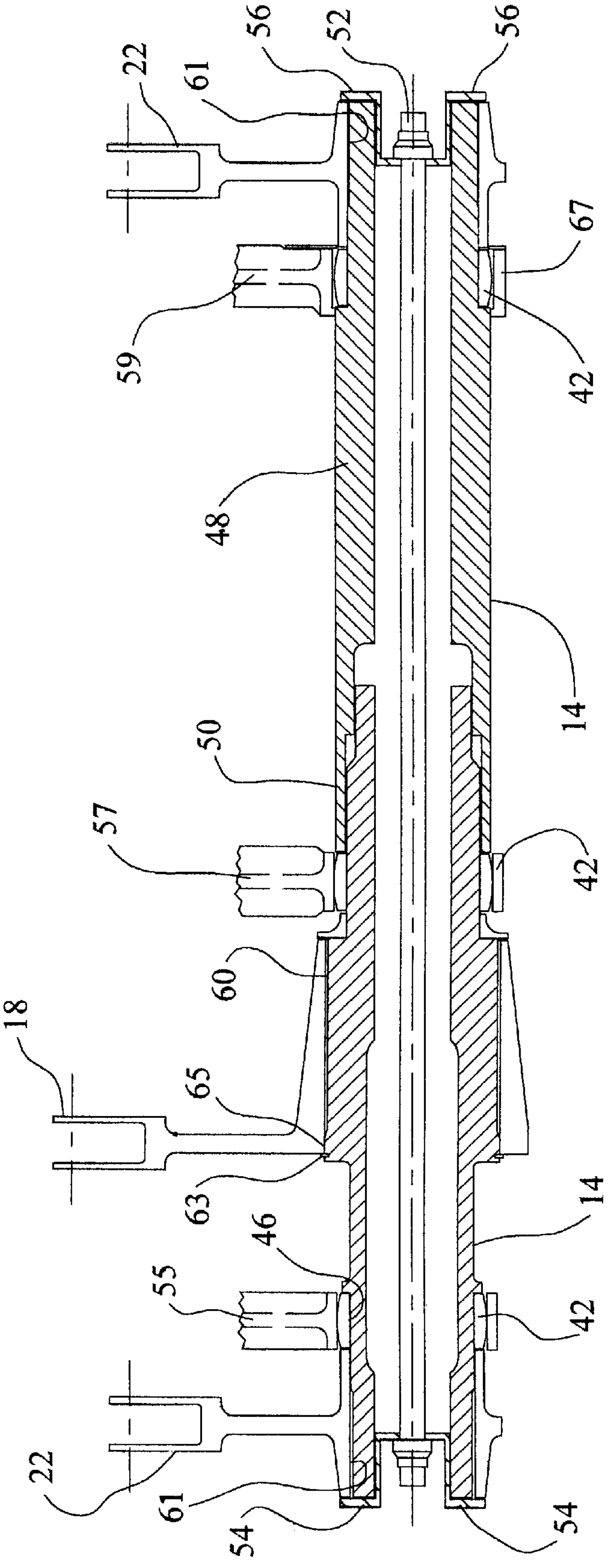
FIG. 2 is a sectional view taken through the lines 2—2 of FIG. 1.

The invention is best understood by referring to the schematic illustration of FIG. 1 showing a convergent/divergent nozzle and the actuation system. Since the actuation system above the horizontal center line is identical as the actuation system below the horizontal center line and the teachings of this invention can be understood by understanding one of the actuation systems, the remaining portion of this description will be devoted to the upper actuation system. As best seen in FIG. 1, the actuation system for the convergent/divergent nozzle is generally illustrated by reference numeral 10 consisting of actuator 12 suitably attached to the torque shaft 14 via the push rod 16, pivot point 17 and the crank arm 18. Optionally, the actuator 12 that is utilized in this actuation system can either be any of the well known electrical types of systems or is it can be any of the well known hydraulic types and for the sake of convenience and simplicity of this application a hydraulic control system is described in connection with the embodiment depicted in FIGS. 3 and 4. As seen in FIG. 2 the torque being transmitted to actuator 12 is transmitted to a pair of crank arms 20 (only one being shown) located at different ends of the torque shaft 14 that serve to push on a pair of links 22 (only one being shown) to position the convergent flap 26. The location of the links 22 relative to the torque shaft 14 is selected to optimize for symmetrical loading of the flap 26. Of course, the same is also the case with the orientation of the linkage and pivots in the other cooperating flap in the lower hemisphere of the drawing.

As is apparent from the foregoing the lower end of link 22 is pivotally mounted to the boss 23 formed on the top surface of the convergent flap 26 and the horizontal movement of push rod 16 by virtue of the actuation of actuator 12 serves to position the flap 26 toward and away from the center line A and consequently control the area of the throat B of the nozzle 10. The end of flap 26 is pivotally mounted to the flap hinge pin 28 and as flap 26 pivots about hinge pin 28, the convergent flap 26 is positioned as is the divergent flap 30 that is hingedly connected thereto by the hinge connection 32.

As was mentioned in the earlier portion of this patent application, this invention serves to reduce the horsepower requirements of the actuator hydraulic supply system by optimizing the geometry of the components of the actuation and linkage system. To this end, the actuator load is oriented so that it acts substantially tangential to the crank arms 18 and the links 22 (two being utilized) are oriented so that they are normal to the convergent flap 26 at the maximum loading condition of the nozzle 10. Further reduction in horsepower requirements of the actuator hydraulic supply system is obtained by including a pressure balancing hood 40 attached to the forward end of the convergent flap 26.

In addition to providing a efficacious actuation system for the convergent/divergent nozzle 10 that is characterized by providing a smaller and lighter actuator for the same loadings as heretofore known systems, this invention also provides a system that is adapted to fit into a limited space as dictated by the manufacturer of the airframe.

The packaging of the working systems as described above is made smaller because of the judicious selection and orientation of components of the actuation system. Spherical type of bearings 42 are utilized to rotary the torque shaft 14 so as to allow relative deflection of the static structure with minimum effect on the actuation system. In this embodiment the torque shaft is made in two halves, the fore portion 46 and aft portion 48 which are connected by the spline 50. The system is tied together by the tie rod 52 extending through the axial axis. The tie rod 52 attaches to opposing end cups 54 and 56 that hold the shaft portions 46 and 48 together and retain crank arms 18 and 20. Crank arms 18 and 20 are splined to the torque shaft 14 via the splines 60 and 61. Retaining ring 63 fitted into slot 65 serves to position the crank arm relative to the torque shaft 14. As is apparent from the foregoing the entire assembly can be removed from inside the nozzle static structure by removing the tie rod 52 and end cups 54 and 56. This has the advantage of allowing the maintenance or replacement of components of the actuation system without having to remove major components of the convergent/divergent nozzle assembly.

The torque shaft 14 in this embodiment are rotary supported by the spherical bearings 42 which, in turn is supported to the nozzle static structure via the support arms 55, 57 and 59. This arrangement serves to minimize the friction and obtain an improvement in the load carrying capacity of the actuation system. In this embodiment, since the system employs spaced crank arms 20 rather than a single crank arm as the heretofore known systems utilized, the problem of the convergent flap deflecting and causing the throat area to vary from center to side walls is obviated.

Figure 3:
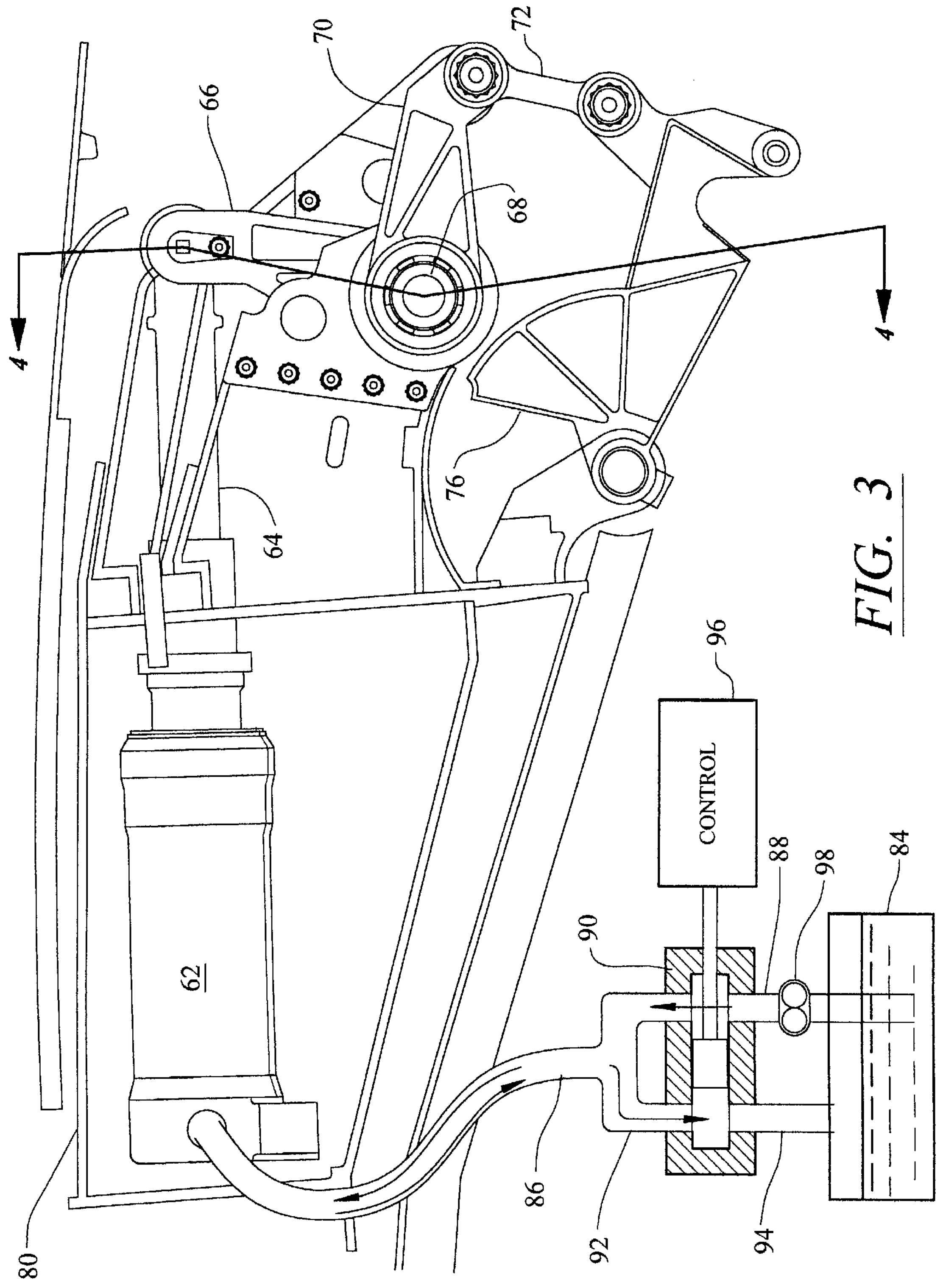
FIG. 3 is a plan view that exemplifies another embodiment of this invention.
Figure 4:
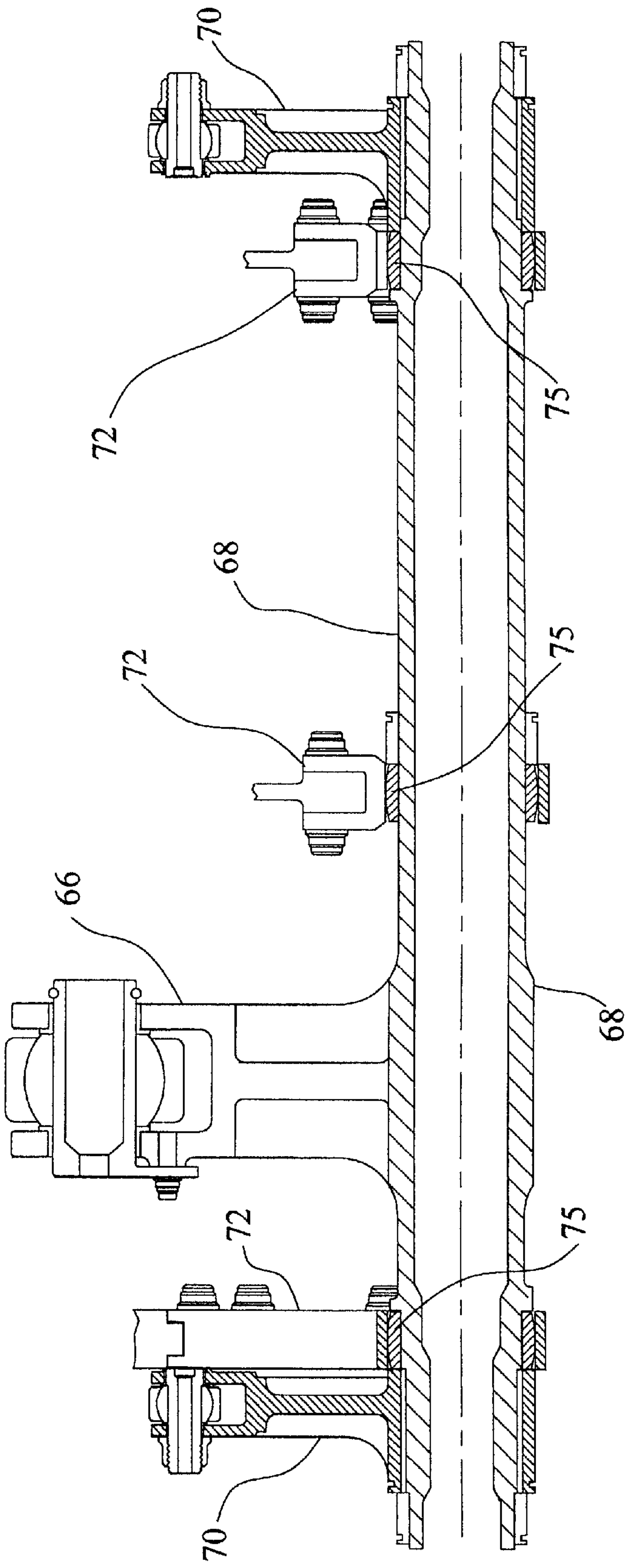
FIG. 4 is a sectional view taken along line 4—4 of FIG. 3.

FIGS. 3 and 4 exemplify another embodiment of this invention wherein the hydraulic actuator 62 is supported to the transition duct 80 that interconnects the gas turbine engine (not shown) and the exhaust nozzle assembly. The actuator 62 includes the connecting or push rod 64 having one end pivotally attached to the crank arm 66 for rotating the torque shaft 68 and consequently the crank arm 70 affixed thereto. Crank arm 70 is pivotally attached to the connecting link 72 that in turn is pivotally connected to the convergent flap 74 for positioning the flap 74 upwardly and downwardly toward and away from the nozzle center line in the same manner as was described with the mechanism depicted in FIGS. 1 and 2. Also included is the pressure balancing hood 76 attached to the outer surface of the forward end of the flap 74 which like the embodiment depicted in FIGS. 1 and 2 serves to reduce the horsepower requirement of the hydraulic supply to the actuator 62.

In this embodiment as shown in FIG. 4 the torque shaft 68 is made from a single piece and eliminates the tie rod and end cups as depicted in FIG. 2. Similar to the crank arms 20, 20 of FIG. 2, the two crank arms 70 and 70 are spaced at the opposite ends of the torque shaft 68 similarly to the orientation of the crank arms structure depicted in the other embodiment and the crank arm 66 is mounted intermediate thereof and operate in the same manner as was described in the other embodiment. Additionally the three support members 72 that support the torque shaft 68 to the static structure via the spherical bearings 75 also operate in the same manner as was described above.

In order to actuate the actuator 62 schematically shown is a hydraulic system that feeds fluid from the hydraulic source 84 through lines 86 and 88 via the spool valve 90 and returns fluid from actuator 62 through line 86 and branch line 92, spool valve 90 and line 94. The position of spool valve 90 is controlled by a suitable control 96 that serves to position the spool of spool valve 90 to direct the fluid into and out of the actuator 62 in response to a control signal. A suitable hydraulic pump 98 is utilized to pressurize the fluid and generate the proper horsepower of the hydraulic supply system.

What has been shown by this invention is a hydraulically actuated actuation system for positioning the flaps of a convergent/divergent exhaust nozzle of a gas turbine engine powering aircraft that is lighter than heretofore known systems, is capable of being fitted into a limited space and lowers the horsepower requirements, reduces distortion and obtains a more constant throat area, lowers the vertical loads on the convergent flap forward hinge, lowers the friction in the hinge connection of the convergent/divergent flaps because the flap distortion is eliminated or at least reduced from heretofore known systems, and the load distribution for the supporting structure is more evenly distributed.

Although this invention has been shown and described with respect to detailed embodiments thereof, it will be appreciated and understood by those skilled in the art that various changes in form and detail thereof may be made without departing from the spirit and scope of the claimed invention.

We claim:

1. An actuation system comprising an actuator for positioning the convergent/divergent exhaust nozzle of a gas turbine engine for powering aircraft, a torque shaft supported for rotary motion, a crank arm operatively connected to the actuator and said torque shaft for rotating said torque shaft, a pair of spaced crank arms affixed to said torque shaft at opposite ends thereof, a convergent flap, a pair of links each being attached to said convergent flap and each of said pair of links operatively connected to each of said pair of spaced crank arms for positioning said flap toward and away from the nozzle center line.

2. An actuation system as claimed in claim 1 including a pressure balancing hood attached to the forward end of said convergent flap.

3. An actuation system as claimed in claim 1 including a tie rod axially extending along the centerline of said torque shaft, a pair of oppositely opposed caps attached to said tie rod, said torque shaft having a forward portion and a rearward portion splined to each other, said tie rod and said forward and rearward caps retaining said torque shaft.

4. An actuation system as claimed in claim 3 wherein said pair of links are oriented normal to the convergent flap when the loads on said nozzle are at the maximum level.

5. An actuation system as claimed in claim 4 wherein the actuator includes a push rod, said push rod being oriented tangentially to said crank arm.

6. An actuation system as claimed in claim 5 wherein said actuation system is a hydraulic system, a source of hydraulic fluid, fluid connections for leading fluid into and extracting fluid out of said actuator and a control for controlling the amount of fluid being lead into said actuator and the amount of fluid being extracted therefrom.

7. An hydraulic actuation system comprising an actuator for positioning the convergent/divergent exhaust nozzle of a gas turbine engine for powering aircraft, a torque shaft supported for rotary motion, a crank arm operatively connected to the actuator for rotating said torque shaft, a pair of spaced crank arms affixed to said torque shaft at opposite ends thereof, a convergent flap, a pair of links each being attached to said flap and to each of said pair of spaced crank arms for positioning said flap toward and away from the nozzle center line, a source of hydraulic fluid, fluid interconnecting lines for leading fluid into said actuator and extracting fluid out of said actuator, and a control for controlling the amount of fluid being lead into said actuator and the amount of fluid being extracted out of said actuator.

8. An actuation system as claimed in claim 7 including a pressure balancing hood attached to the forward end of said convergent flap.

9. An actuation system as claimed in claim 8 wherein said pair of links are oriented normal to the convergent flap when the loads on said nozzle are at the maximum level.

10. An actuation system as claimed in claim 9 wherein the actuator includes a push rod, said push rod being oriented tangentially to said crank arm.

* * * * *